United States Patent [19]

Mettner et al.

[11] Patent Number: 5,271,431
[45] Date of Patent: Dec. 21, 1993

[54] MICROVALVE

[75] Inventors: Michael Mettner, Ludwigsburg; Thomas Grauer, Stuttgart, both of Fed. Rep. of Germany

[73] Assignee: Robert Bosch GmbH, Stuttgart, Fed. Rep. of Germany

[21] Appl. No.: 917,011

[22] PCT Filed: Jan. 16, 1991

[86] PCT No.: PCT/DE91/00023
 § 371 Date: Aug. 7, 1992
 § 102(e) Date: Aug. 7, 1992

[87] PCT Pub. No.: WO91/12434
 PCT Pub. Date: Aug. 22, 1991

[30] Foreign Application Priority Data

Feb. 7, 1990 [DE] Fed. Rep. of Germany ........ 4003619

[51] Int. Cl.$^5$ .................................................. F15C 1/04
[52] U.S. Cl. .................................. 137/831; 137/819; 137/833; 251/129.06
[58] Field of Search .............. 137/815, 819, 825, 829, 137/831, 833; 251/129.06

[56] References Cited

U.S. PATENT DOCUMENTS

| 3,266,551 | 8/1966 | Turick | 137/831 |
|---|---|---|---|
| 3,342,198 | 9/1967 | Groeber | 137/829 |
| 3,417,813 | 12/1968 | Perry | 165/804 |
| 3,426,800 | 2/1969 | Bauer | 137/831 |
| 3,451,412 | 6/1969 | Render | 137/831 |
| 3,457,933 | 7/1969 | Craft | 137/831 |
| 3,556,119 | 1/1971 | Ankeney | 137/831 |
| 3,557,816 | 1/1971 | Small | 137/829 |
| 3,605,780 | 9/1971 | Kranz | 137/875 |
| 3,747,644 | 7/1973 | Tompsett | 137/831 |
| 3,771,567 | 11/1973 | Linden | 137/831 |
| 4,203,312 | 5/1980 | Guckel et al. | 137/831 |
| 4,326,559 | 4/1982 | Drzewiecki | 137/831 |
| 4,581,624 | 4/1986 | O'Conner | 251/129.06 |
| 4,809,730 | 3/1989 | Taff et al. | 137/831 |

FOREIGN PATENT DOCUMENTS 0579460  11/1977  U.S.S.R. .................. 137/831

Primary Examiner—A. Michael Chambers
Attorney, Agent, or Firm—Frishauf, Holtz, Goodman & Woodward

[57] ABSTRACT

A microvalve in multi-layer structure is proposed, where an inlet connector, a return connector and an outlet connector are produced by planar structuring of material layers. The microvalve has a first and a second stage, which is disposed behind the first stage in respect to the flow direction of the fluid. In the first stage the flow direction of the fluid is directed into a cavity formed by two chambers by means of a flexible tongue, which in the position of rest is oriented parallel to the flow direction of the fluid. At least one outlet connector is disposed in the second stage.

12 Claims, 3 Drawing Sheets

MICROVALVE

FIELD OF THE INVENTION

The invention relates to a microvalve.

BACKGROUND

A valve is already known from U.S. Pat. No. 3,457,933, Craft, where a fluid stream is directed into two chambers by a piezo-electrically actuated flexible tongue. However, this valve is not contructed of wafers.

A microvalve is already known from not previously published German Patent Application P 39 19 876, corresponding to U.S. Pat. No. 5,161,774, which is produced as a multi-layer structure. The particular importance of this micro-mechanical valve lies in a type of construction, where the static pressure is compensated, which is essentially realized in three layers. With the microvalve not actuated, the fluid flows into an annular chamber the bottom surface of which is formed by an annular diaphragm and which is closed off at the top by the closing member seated on the valve seat. Because of the pressure-compensated construction of the valve, the pre-stressing force of the diaphragm results in a tight seat of the closing member on the valve seat, so that the connection to the outlet connector is blocked. A closed-off cavity, in which a defined pressure is present and to the bottom surface of which an electrode has been applied, is located underneath the annular diaphragm. This electrode is used for electrostatic opening of the valve. To close the valve, the electrostatic drive is shut off, whereupon the closing member again rests on the valve seat because of the effect of the restoring force of the annular membrane The mode of operation of this microvalve requires a complicated structure, where the dimensions of the individual structural elements must be adapted to each other.

THE INVENTION

In contrast to this, the microvalve has the advantage that its mode of operation does not require static pressure compensation, for which reason its structure, and in this connection its manufacture, too, are considerably simplified. Standard processes of micro-mechanics and -electronics can be employed to a large extent in its manufacture. The microvalve of the invention can be employed particularly advantageously as a not tightly sealing control valve. Control of the flow direction of the fluid flow or fluid stream by means of a flexible tongue made of the structure of the wafer, which in the position of rest is oriented parallel to the direction of flow, is advantageous.

It is also advantageous that microvalves, when used as injection valves or in servo valves, for example, are impervious to shock and dirt. The microvalve of the invention can also be advantageously actuated by means of an electro-thermal drive, since a high degree of switching dynamics can be achieved because of its small size and direct cooling by the fluid flowing through. It is also advantageous that almost no switching noises appear in the course of using the microvalve and there is very little wear. It must also be considered to be a particular advantage that a plurality of microvalves can be combined in many ways, so that a large range of flow-through variations can be simply realized.

It is particularly advantageous if opening and closing of the valve takes place hydraulically, in that the flexible tongue placed upstream of the actual closing device controls the flow direction of the fluid flow or fluid stream. The pressure difference between the two sides of the diaphragm, required for the excursion of the closing member, is built up by the fluid flow or fluid stream itself. Accordingly, no reference pressure which must be preset is required. When orienting the flexible tongue opposite the flow direction of the fluid flow or fluid stream, the flexible tongue can be used advantageously as a stream deflector. It is particularly advantageous that the flexible tongue can be deflected under electrical control. This can take place piezo-electrically or thermo-electrically. For this purpose the flexible tongue is advantageously constructed in several layers. A structure with two layers in the form of a piezo-electrical bimorph or with two layers with different thermal expansion coefficients has proven to be particularly advantageous. In this case, the flexible tongue can only be deflected in one direction.

It is also advantageous to realize the flexible tongue in three layers, because by means of an appropriate structure, for example as piezo-electrical trimorph, it can be deflected in a simple manner in two directions. It has been shown to be particularly advantageous to construct the microvalve of silicon wafers and glass wafers, because it is possible to employ the methods customary in micro-mechanics and micro-electronics in its manufacture.

DRAWINGS

Three exemplary embodiments of the invention are illustrated in the drawings, and explained in detail in the following description.

FIG. 1 shows a longitudinal section through a microvalve,

FIG. 2 a longitudinal section through a further microvalve and

FIG. 3 the first stage of a modularly constructed microvalve.

DETAILED DESCRIPTION

Figure 1:
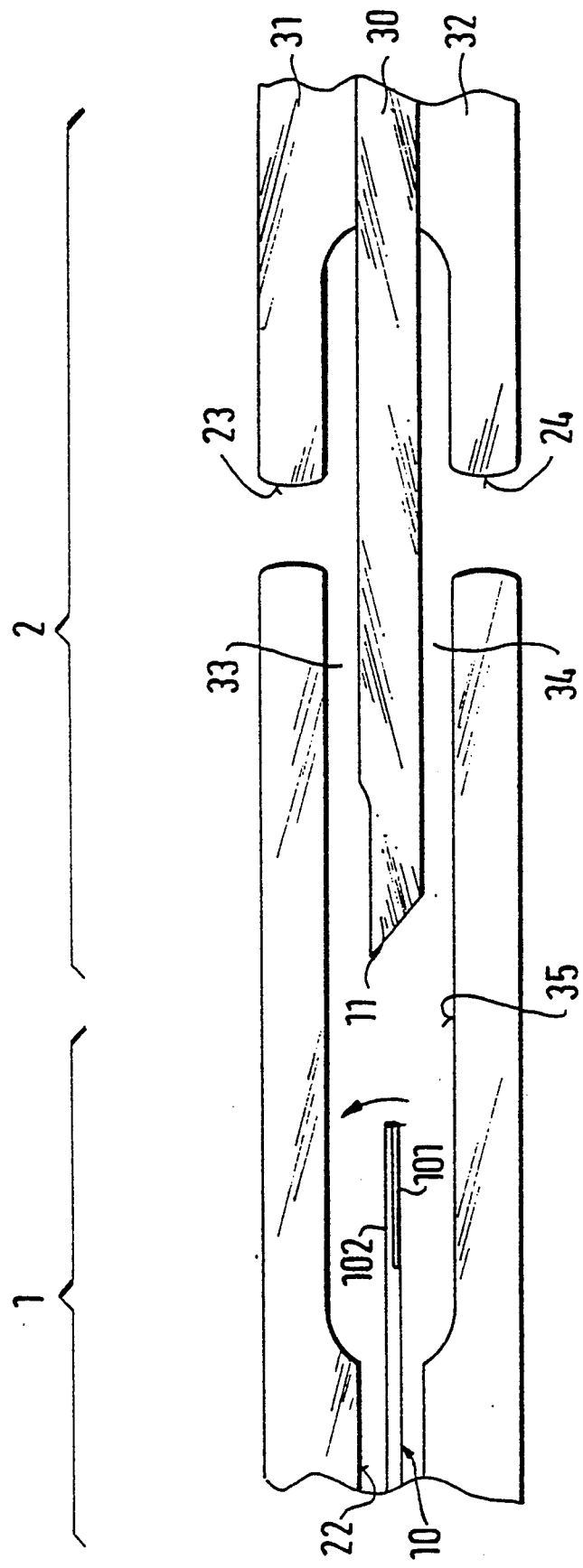

FIG. 1 shows a longitudinal section through a microvalve in multi-layer construction in a very greatly enlarged and simplified view, in which the individual layers are constructed of different materials. Fabrication technologies known per se from the semiconductor technology, in particular under the terms silicon technology, thin film technology or thick film technology, are employed for manufacturing this multi-layer structure. These technologies for producing a defined three-dimensional shape in a multi-layer structure and their possibilities of forming defined mechanical elements by means of structural details are here presumed to be known.

Essentially, the microvalve has a first covering 31, a structured wafer 30 and a second covering 32. The wafer 30 can be a silicon wafer, for example, to which the first and second coverings 31 and 32 are bonded, which could be, for example, silicon or glass wafers. Because of the structure of the wafer 30, an inlet connector 22 is located between the first covering 31 and the second covering 32. The inlet connector 22 terminates in a cavity 35 formed by two chambers 33 and 34.

The two chambers 33 and 34 can be formed by recesses in the first covering 31 and the second covering 32, for example. The structured wafer 30 is used as the separating layer between the two chambers 33, 34. At least one outlet connector 23 is located in the first covering 31 in the area of the chamber 33. At least one return connector 24 is located in the second covering 32 in the area of the chamber 34. The structured wafer 30 separating the two chambers 33 and 34 essentially has two structural elements, a flexible tongue 10 and a wedge-shaped tip 11. The fluid flows through the inlet connector 22 along the flexible tongue 10 into the cavity 35. In this example, the flexible tongue 10 is constructed in two layers 101 and 102. The layer 101 can be triggered piezo-electrically or thermo-electrically, by means of which the flexible tongue 10 can be deflected in the direction indicated by the arrow. The inlet connector 22 and the flexible tongue 10 are designated as stage 1. The flexible tongue 10 is used as stream deflector in the cavity 35. Depending on the position of the flexible tongue 10, the fluid can be directed into one of the two chambers 33 or 34.

A stage 2 is disposed behind the stage 1 in relation to the flow direction of the fluid. In this example is essentially consists of a tip 11, structured in the shape of a wedge, of the silicon wafer 30, on which the fluid impacts. The creation of swirls during the deflection of the fluid is prevented to a large extent by means of this shape of the tip 11. The microvalve shown is a not tightly sealing valve which can be used, for example, as a control valve in servo valves.

Figure 2:
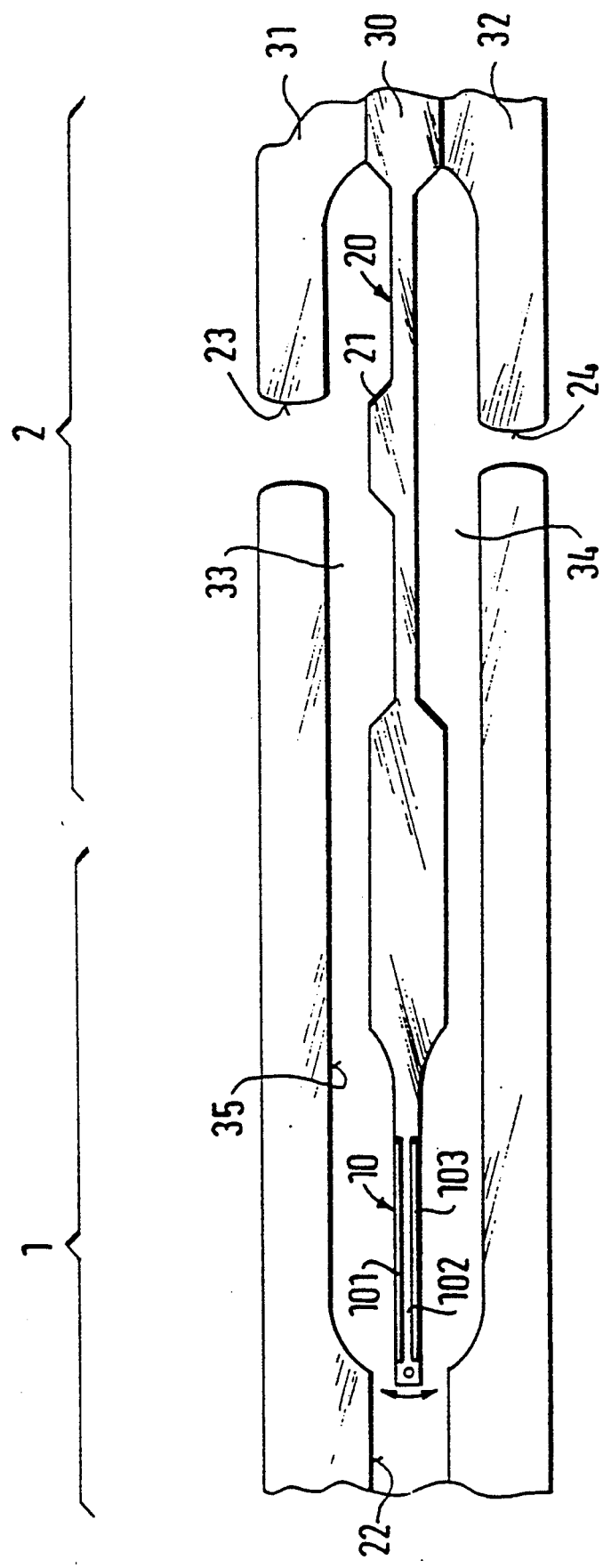

Another form of embodiment of the microvalve is shown in FIG. 2. Here, the flexible tongue 10 is embodied in three layers 101, 102, 103. The two outer layers 101 and 103 are electrically actuable layers, for example piezo-electrically or thermo-electrically, the center layer 102 cannot be triggered electrically. Triggering of one of the outer layers 101 or 103 results in a change in the length of the respective layer and thus in bending of the flexible tongue 10 in one of the two directions indicated by the two-headed arrow. In contrast to the embodiment of the microvalve shown in FIG. 1, where the flexible tongue 10 is disposed in the flow direction of the fluid, a flexible tongue 10 is shown in FIG. 2 which is oriented against the flow direction of the fluid. If the flow direction of the fluid is followed, the flexible tongue 10, disposed in the cavity 35, is first encountered. In the deflected state, it is used as a path limitation for the fluid and determines in this way to what extent the fluid flows into the chambers 33 and/or 34. Together with the inlet connector 22 it constitutes the stage 1. In this example the stage 2 essentially has two structural elements, a diaphragm 20 made of the structure of the the wafer 30 and a closing member 21 located on the diaphragm 20. The diaphragm 20 with the closing member 21 is located in that part of the cavity 35 where the first covering 31 has the outlet connector 23. The diaphragm 20 with the closing member 21 is disposed in relation to the outlet connector 23 in such a way that a suitable deflection of the diaphragm 20 causes the closing of the outlet connector 23 by means of the closing member 21.

The mode of operation of the microvalve is explained as follows:

The incoming fluid flowing through the inlet connector 22 into the stage 1 of the microvalve is preferably routed into one of the two chambers 33 or 34 with the aid of the deflectable flexible tongue 10. A pressure difference between the two chambers 33 and 34 is generated by the speed of the fluid and leads to a deflection of the diaphragm 20. If the position of the flexible tongue 10 is such that the fluid flows into the chamber 34 and is to be removed via the return connector 24, pressure builds up in the chamber 34 which deflects the diaphragm 20 far enough that the closing member 21 tightly seals the outlet connector 23. If the pressure in the chamber 34 abates, for example because the flexible tongue 10 is actuated, the closing member 21 is automatically released from the outlet connector 23 because of the restoring forces of the diaphragm 20.

Figure 3:
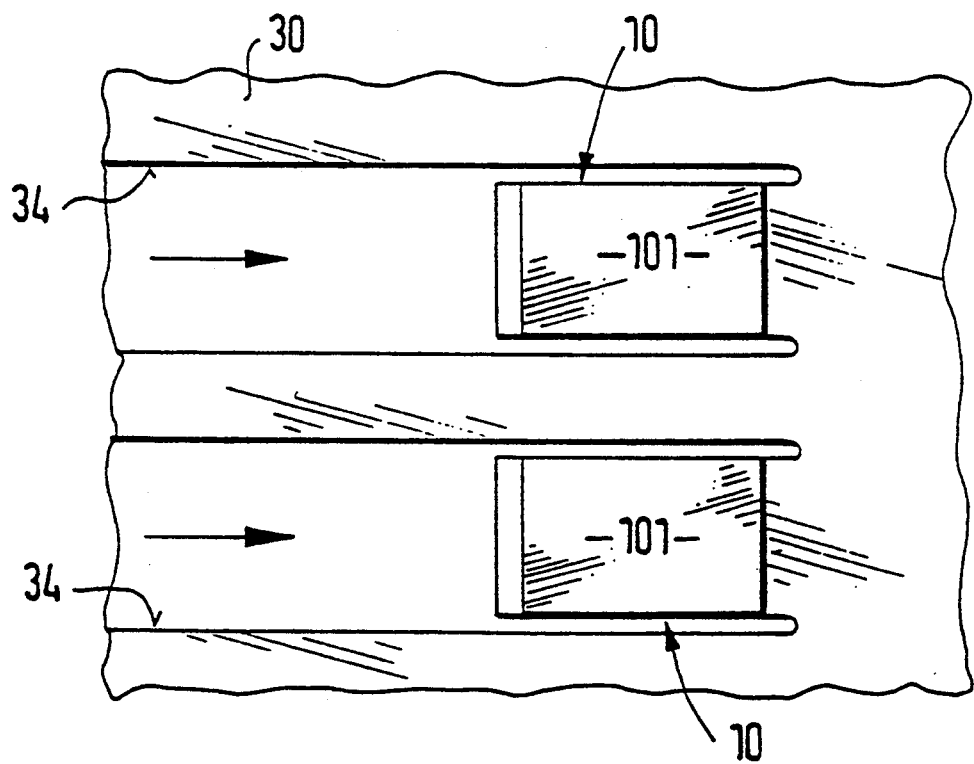

A top view of the stages 1 of two parallel disposed microvalves is shown in FIG. 3. In this case these are microvalves, the flexible tongues 10 of which are oriented counter to the flow direction of the fluid flow or fluid stream indicated by the arrows. The flexible tongues 10 have an electrically triggerable layer 101.

Varied combinations and wiring possibilities of the first and second stages of a plurality of microvalves are possible. For example, many tongues can act on one or a plurality of diaphragms. Particularly in the case of valves which can only realize two positions, open/closed, it is possible by means of a combination of several valves to control the amount of fluid flowing to the individual connectors by different switch positions of the individual valves.

We claim:

1. A valve with an inlet connector (22), at least one return connector (24), at least one outlet connector (23) and a cavity (35) formed by two chambers (33, 34), where the valve has a first stage (1), by means of which the flow direction of a fluid flow or fluid stream entering through the inlet connector (22) can be directed into one of the two chambers (33, 34), and the control of the flow direction of the fluid flow or fluid stream takes place by means of a flexible tongue (10) which, in the position of rest, is oriented parallel to the flow direction of the fluid flow or fluid stream, and furthermore has a second stage (2) having the at least one outlet connector (23), where the second stage (2) is disposed behind the first stage (1) in respect to the flow direction of the fluid flow or fluid stream, characterized in that the valve is embodied as a microvalve, where one layer of the microvalve is embodied by a structured wafer (30), that the structured wafer (30) is connected with a first covering (31) and a second covering (32), that the inlet connector (22) is formed out of the material of the wafer (30) between the first covering (31) and the second covering (32), that the inlet connector (22) terminates in a cavity (35), which is separated into a first chamber (33) and a second chamber (34) by the structured wafer (30), that the flexible tongue (10) is movable in a direction perpendicular to structured wafer (30) to control the flow direction, that the first covering (31) has the at least one outlet connector (23) and that the second covering (32) has the at least one return connector (24).

2. A valve in accordance with claim 1, characterized in that
the second stage (2) has at least one closing member (21) produced by planar structuring of layers of material, that the at least one closing member (21) can be moved by means of a resilient diaphragm (20), which is integrated into one of the layers, and that the at least one outlet connector (23) is closed by means of the at least one closing member (21) when the fluid flow or fluid stream is directed into a preselected chamber.

3. A valve in accordance with claim 1 characterized in that
the first covering (31) has at least one return connector (24).

4. A valve in accordance with claim 1 characterized in that
the flexible tongue (10) can be deflected by electrical triggering.

5. A valve in accordance with claim 1 characterized in that
the flexible tongue (10) is embodied as a piezo-electrical bimorph or as a piezo-electrical trimorph.

6. A valve in accordance with claim 1 characterized in that
the flexible tongue (10) is constructed in layers of materials having different expansion coefficients, preferably asymmetrically in at least two layers or symmetrically in at least three layers and that the flexible tongue (10) can be deflected by means of electrical heating.

7. A valve in accordance with claim 1 characterized in that
the flexible tongue (10) is oriented counter to the flow direction of the fluid flow or fluid stream, so that the fluid flow or the fluid stream first impacts on the deflectable tip of the flexible tongue (10), and that the deflected flexible tongue (10) is used as path limitation for the fluid flow or fluid stream.

8. A valve in accordance with claim 1 characterized in that
flexible tongue (10) is oriented in the flow direction of the fluid flow or fluid stream, so that the fluid flow or fluid stream is guided along the flexible tongue (10) in the direction towards the tip (11) and that the deflected flexible tongue (10) is used a stream deflector.

9. A valve in accordance with claim 1 characterized in that
the structured wafer (30) is a silicon wafer.

10. A valve in accordance with claim 1 characterized in that
the first covering (31) and/or the second covering (32) are structured or unstructered, that the first covering (31) and/or the second covering (32) are made of silicon and/or glass and that the first covering (31) and the second covering (32) are bonded to the structured wafer (30).

11. A valve in accordance with claim 1, characterized in that
a plurality of similar valves are simultaneously switched.

12. A valve in accordance with claim 1 characterized in that
a plurality of similar first stages (1) act on one or a plurality of similar second stages (2).

* * * * *